(12) United States Patent
Jiang et al.

(10) Patent No.: US 10,999,389 B2
(45) Date of Patent: May 4, 2021

(54) METHOD AND DEVICE FOR ACQUIRING DYNAMIC MAP DATA, AND STORAGE MEDIUM

(71) Applicant: BAIDU ONLINE NETWORK TECHNOLOGY (BEIJING) CO., LTD., Beijing (CN)

(72) Inventors: Chang Jiang, Beijing (CN); Zhitang Li, Beijing (CN); Xi Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 177 days.

(21) Appl. No.: 16/391,120

(22) Filed: Apr. 22, 2019

(65) Prior Publication Data
US 2019/0364122 A1 Nov. 28, 2019

(30) Foreign Application Priority Data

May 24, 2018 (CN) .......................... 201810509203.1

(51) Int. Cl.
*G06F 15/16* (2006.01)
*H04L 29/08* (2006.01)
(Continued)

(52) U.S. Cl.
CPC ................ *H04L 67/26* (2013.01); *E01F 9/30* (2016.02); *E01F 9/604* (2016.02)

(58) Field of Classification Search
CPC .... H04L 67/26; E01F 9/30; E01F 9/60; E01F 9/604; E01F 9/608; E01F 9/688; E01F 13/02
(Continued)

(56) References Cited

U.S. PATENT DOCUMENTS

2005/0165521 A1* 7/2005 Gruhn .................... A01B 45/00
701/29.5
2008/0125970 A1 5/2008 Scheckler
(Continued)

FOREIGN PATENT DOCUMENTS

CN 107229690 A 10/2017
JP 2004077335 A 3/2004
(Continued)

OTHER PUBLICATIONS

Chinese Patent Application No. 201810509203.1 Office Action dated Apr. 11, 2019, 7 pages.
(Continued)

*Primary Examiner* — Imad Hussain
(74) *Attorney, Agent, or Firm* — Lathrop GPM LLP

(57) ABSTRACT

The present disclosure provides a method and a device for acquiring dynamic map data, and a storage medium. The method includes: acquiring, by a road operation device having a network access capacity, dynamic map data of a road work site where the road operation device is located; and providing, by the road operation device having the network access capacity, the dynamic map data to a map service system through a dynamic map data acquisition system, such that the map service system reflects content of the dynamic map data in a predetermined product form.

20 Claims, 4 Drawing Sheets

(51) Int. Cl.
*E01F 9/30* (2016.01)
*E01F 9/604* (2016.01)

(58) Field of Classification Search
USPC .......................................................... 709/217
See application file for complete search history.

(56) References Cited

U.S. PATENT DOCUMENTS

| | | |
|---|---|---|
| 2009/0169055 A1 | 7/2009 | Ishikawa |
| 2010/0283631 A1* | 11/2010 | Bryant ..................... G08G 1/07 340/916 |
| 2017/0328723 A1* | 11/2017 | True ....................... G01C 21/34 |
| 2018/0144628 A1* | 5/2018 | Nicholson ............ G08G 1/0955 |
| 2018/0188052 A1* | 7/2018 | Singh ................. G01C 21/3476 |
| 2020/0098257 A1* | 3/2020 | Lykkja ..................... E01F 9/646 |
| 2020/0290638 A1* | 9/2020 | Damnjanovic ...... G08G 1/0112 |

FOREIGN PATENT DOCUMENTS

| | | |
|---|---|---|
| JP | 2009156784 A | 7/2009 |
| JP | 2012519416 A | 8/2012 |
| JP | 2018005523 A | 1/2018 |
| KR | 20180005484 A | 1/2018 |
| WO | 2018026603 A1 | 2/2018 |

OTHER PUBLICATIONS

Chinese Patent Application No. 201810509203.1 English translation of Office Action dated Apr. 11, 2019, 9 pages.

Velizhev, A., Project acronym AUTOPILOT Project full title Automated driving Progressed by Internet of Things, Jul. 2, 2018, 67 pages.

European Patent Application No. 19169903.2 extended Search Report and Opinion dated Oct. 18, 2019, 10 pages.

Japanese Patent Application No. 2019-044358 Office Action dated Oct. 6, 2020, 4 pages.

Japanese Patent Application No. 2019-044358 English translation of Office Action dated Oct. 6, 2020, 5 pages.

* cited by examiner

METHOD AND DEVICE FOR ACQUIRING DYNAMIC MAP DATA, AND STORAGE MEDIUM

CROSS-REFERENCE TO RELATED APPLICATIONS

This application claims priority to and benefits of Chinese Patent Application No. 201810509203.1, filed with the National Intellectual Property Administration of P. R. China on May 24, 2018, the entire contents of which are incorporated herein by reference.

FIELD

The present disclosure relates to Internet of Things technology, and more particularly to a method and a device for acquiring dynamic map data, and a storage medium.

BACKGROUND

A map is a product relies heavily on data, and the quality of the data will directly affect the service provided by the map to users.

At present, China's infrastructure construction is developing rapidly. Dynamic map data (such as road construction, accidents, temporary traffic control, etc.) is frequently changed, and it is a big problem for map products to accurately and efficiently obtain dynamic map data and provide users with a better map service experience.

Regarding the above problems, there are following solutions in the related art.

1) Map users actively report the dynamic map data. In actual practice, the users can actively report the road scene that he/she observed through a map client product. However, since it is difficult for users to accurately judge the nature and duration of road operation, the dynamic map data acquired may be inaccurate.

2) Government management department provides relevant information to map service provider. In actual practice, the dynamic map data is provided offline, and the dynamic map data acquired in this way is accurate and authoritative. However, the timeliness and stability of acquiring the data are difficult to guarantee, making it difficult to promote on a large scale.

SUMMARY

A method for acquiring dynamic map data is provided, the method is applicable to a road operation device having a network access capacity, which includes: acquiring dynamic map data of a road work site where the road operation device is located; and providing the dynamic map data to a map service system through a dynamic map data acquisition system, such that the map service system reflects content of the dynamic map data in a predetermined product form.

A computer device is provided, the computer device includes a memory, a processor and a computer program stored in the memory and executable by the processor. When the processor executes the program, the method described above is implemented.

A computer readable storage medium is provided. The computer readable storage medium is configured to store a computer program that, when executed by a processor, causes the method described above to be implemented.

DETAILED DESCRIPTION

In order to make technical solutions of the present disclosure clearer, reference will be made clearly and completely technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

The present disclosure provides a method for acquiring dynamic map data, by utilizing communication capability of Internet of Things devices, the road work site and the dynamic map data acquisition system are truly connected, and dynamic map data can be acquired accurately, efficiently and timely.

Figure 1:
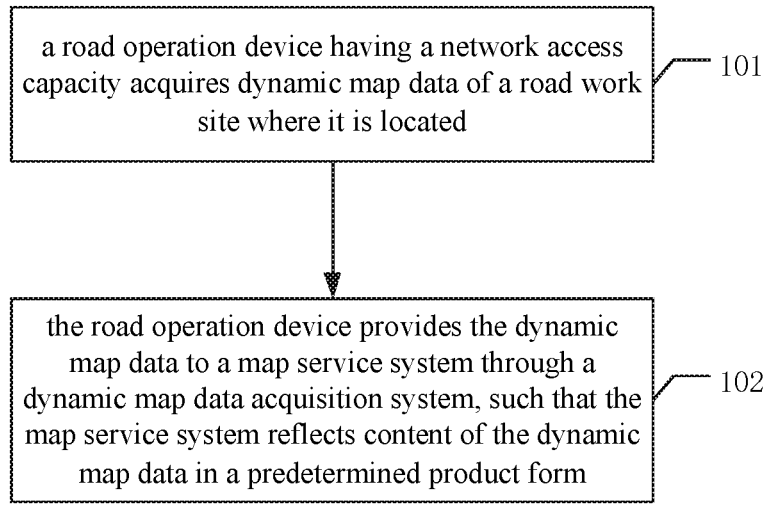
FIG. 1 is a flow chart of a method for acquiring dynamic map data according to a first embodiment of the present disclosure.

FIG. 1 is a flow chart of a method for acquiring dynamic map data according to a first embodiment of the present disclosure. As illustrated in FIG. 1, the method may include the following.

At block 101, a road operation device having a network access capacity acquires dynamic map data of a road work site where it is located.

At block 102, the road operation device provides the dynamic map data to a map service system through a dynamic map data acquisition system, such that the map service system reflects content of the dynamic map data in a predetermined product form.

At the road work site, devices such as traffic cones, triangle warning signs are usually used. In road operation in the related art, these devices are existed as consumables. In fact, manufacturers that meet technical specifications of public security departments and transportation departments can develop and produce operation devices with better waterproof, drop proof, low power consumption, solar energy charging and other qualities, i.e., traffic cones and triangle warning signs in the related art can be upgraded to new road operation devices capable of working 24 hours a day, seven days a week, and having network access capabilities. The new road operation device will serve as the Internet of Thing device.

Assuming that a section of urban roads needs to be closed for construction, the field workers can apply the road operation device. After the road operation device is placed as required, the field workers can turn on the switch of the road operation device, such that the road operation device can start working.

After the road operation device starts working, the road operation device will be connected to a dynamic map data acquisition system, the specific connection manner is not limited herein. Thereafter, the road operation device can periodically acquire the dynamic map data of the road work site where it is located, and report the dynamic map data acquired to the dynamic map data acquisition system.

Generally, the dynamic map data at least includes location information of the road operation device, such as latitude and longitude information of the location. Furthermore, the dynamic map data may also include other information, such as acquisition time (the current time), identification of road operation device, the type of the road work site, and the like.

The road operation device can acquire the location information by its positioning function, and acquire the time information by its built-in clock. In addition, the type information of the road work site may be acquired by acquiring the road work site type information set by the field worker after the field worker turns on the switch of the road operation device, the type information of the road work site may include such as road construction, accident or temporary traffic control. There may be different buttons (which corresponding to different types of the road work site) set on the road operation device, and the field worker can press the button corresponding to the current type of the road work site. Certainly, the above manner of acquiring the type information of the road work site information is merely an example, and is not intended to limit the present disclosure, and other manners that can be conceived by those skilled in the art may also be adopted.

The interval duration between acquisitions of data by the road operation device may be determined according to actual needs, for example, the interval duration may be one minute, five minutes or half an hour. For example, the road operation device may acquire the dynamic map data, and five minutes later, the road operation device may acquire the dynamic map data again.

In addition, a device management system (device management platform) may be set. The road operation device can be connected to the device management system, such that a manager can manage the road operation device through the device management system.

For example, the manager of the road operation device can check the operation state, the operation location and the operation duration of the road operation device in real time through the device management system. For example, the manager of the road operation device may store the operation information (such as the operation location, the operation duration, etc.) of the road operation device, such that the operation information can be viewed later when needed. For example, when there is a need to use the road operation device, the road operation device may be determined based on, such as historical operation duration stored.

The road operation device can report the dynamic map data acquired to the dynamic map data acquisition system, the dynamic map data acquisition system can provide the dynamic map data to the map service system, such that the map service system can reflect the content of the dynamic map data in the predetermined product form.

Figure 2:
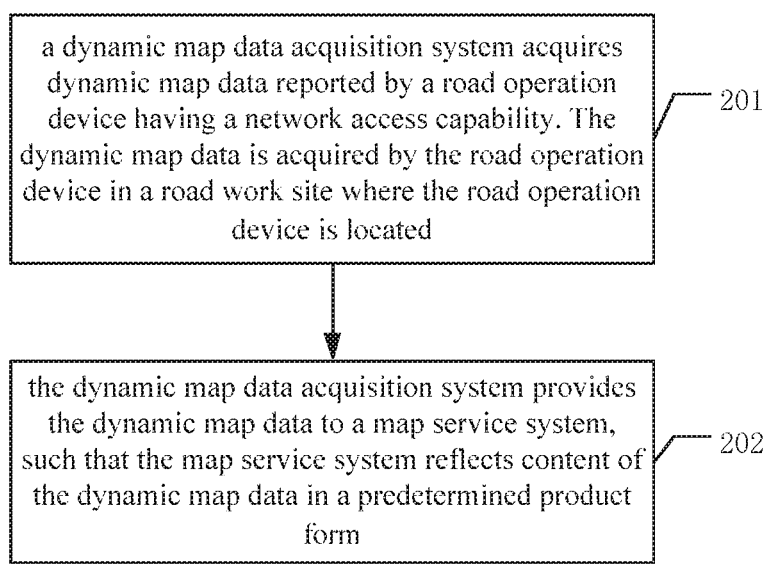
FIG. 2 is a flow chart of a method for acquiring dynamic map data according to a second embodiment of the present disclosure.

FIG. 2 is a flow chart of a method for acquiring dynamic map data according to a second embodiment of the present disclosure. As illustrated in FIG. 2, the method may include the following.

At block 201, a dynamic map data acquisition system acquires dynamic map data reported by a road operation device having a network access capability. The dynamic map data is acquired by the road operation device in a road work site where the road operation device is located.

At block 202, the dynamic map data acquisition system provides the dynamic map data to a map service system, such that the map service system reflects content of the dynamic map data in a predetermined product form.

The dynamic map data acquisition system is a central system connecting the road operation device and the map service system. The dynamic map data acquisition system can receive and process the dynamic map data reported by the road operation device, and then provide the processed dynamic map data to different map service systems, thereby dynamically affecting map usage experience of the user in real time.

The dynamic map data acquisition system can support various data connection manners such as socket and Hyper Text Transfer Protocol (HTTP), so as to match road operation device of different manufacturers and of different types.

The dynamic map data acquisition system may apply open source message queues (such as kafka, etc.) to process the dynamic map data acquired, such as eliminating abnormal data, normalizing the data format, or the like. In addition, the dynamic map data acquisition system may classify the data and store the data based on the data type, for subscription of the map service system. The normalized data format and the data types can be determined according to actual needs.

The dynamic map data acquisition system can provide the processed dynamic map data to the map service system, such that the map service system can reflect the content of the dynamic map data in the predetermined product form.

For the processed dynamic map data, the dynamic map data acquisition system may support subscription of the map service system through kafka, and may also support active push of the data to the map service system.

Figure 3:
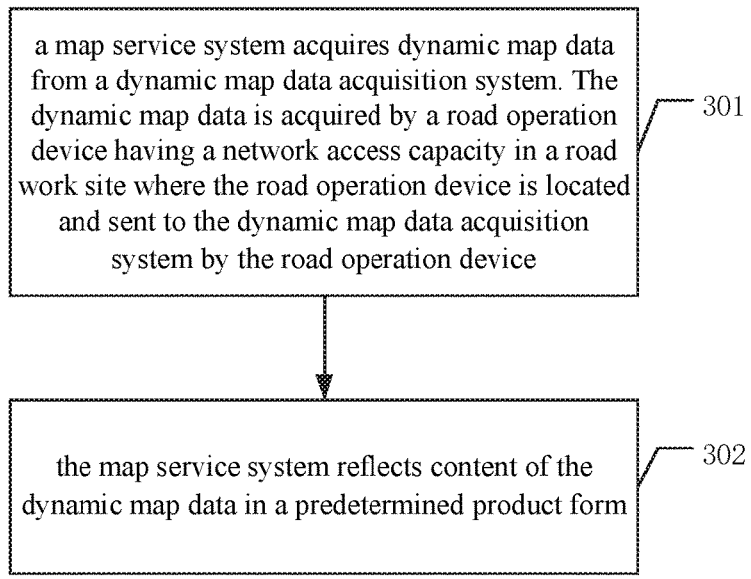
FIG. 3 is a flow chart of a method for acquiring dynamic map data according to a third embodiment of the present disclosure.

FIG. 3 is a flow chart of a method for acquiring dynamic map data according to a third embodiment of the present disclosure. As illustrated in FIG. 3, the method may include the following.

At block 301, a map service system acquires dynamic map data from a dynamic map data acquisition system. The dynamic map data is acquired by a road operation device having a network access capacity in a road work site where the road operation device is located and sent to the dynamic map data acquisition system by the road operation device.

At block 302, the map service system reflects content of the dynamic map data in a predetermined product form.

The map service system may acquire the dynamic map data pushed by the dynamic map data acquisition system actively, or the map service system may subscribe the dynamic map data from the dynamic map data acquisition system.

The map service system may be a system in the related art, which is a base of all map service capacities. For example, the map service system may be cloud, etc.

In the embodiment, the map service system may acquire the dynamic map data timely and accurately, and reflect the content of the dynamic map data in the product form such as map road conditions, navigation routes, and induced broadcasts.

For example, the map service system may determine the road construction area according to the location information of the road operation device, and mark it on the map for the map user to view.

Figure 4:
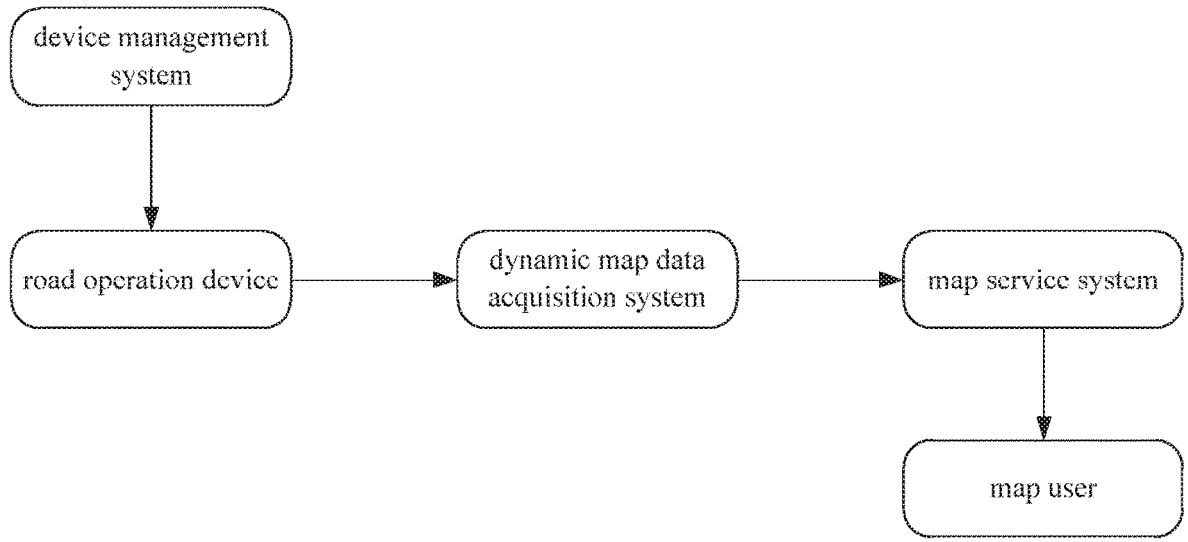
FIG. 4 is a schematic diagram of a relationship among a device management system, a road operation device, a dynamic map data acquisition system, a map service system and a map user according to an embodiment of the present disclosure.

Based on the above, FIG. 4 is a schematic diagram of a relationship among a device management system, a road operation device, a dynamic map data acquisition system, a map service system and a map user according to an embodiment of the present disclosure. For specific implementations, reference may be made to the above, and details are not described.

It will be understood that, for sake of brevity, the foregoing method embodiments are described as combination of a series of actions. Those skilled in the art should understand that the present disclosure is not limited by the described order of actions, and the actions may be performed in other orders or simultaneously. Moreover, those skilled in the art should also understand that the embodiments described in the specification are preferred embodiments, and the actions and modules involved are not necessarily required by the present disclosure.

In the above embodiments, the descriptions of various embodiments are focused differently, and the parts that are not detailed in a certain embodiment can be referred to the related descriptions of other embodiments.

By applying the solutions described in the foregoing method embodiments, the dynamic map data can be accurately acquired by the Internet of Things device (such as the road operation device) set at the road work site, such that the accuracy of the dynamic map data acquired can be improved, and timeliness and stability of dynamic map data acquired can be guaranteed.

In addition, by applying the solution described in the foregoing method embodiments, the road operation device can be better managed through the device management system, and management efficiency can be improved.

Further, by applying the solution described in the foregoing method embodiments, the field of acquisition of dynamic map data can be developed, which has important operation values for accelerating uploading of road operation information, the map usage experience of the user can be greatly improved, the user can accurately avoid road construction areas based on the dynamic map data, and safety of field workers can be improved.

The above is the description of the method embodiments, the device according to embodiments of the present disclosure will be described below through device embodiments.

Figure 5:
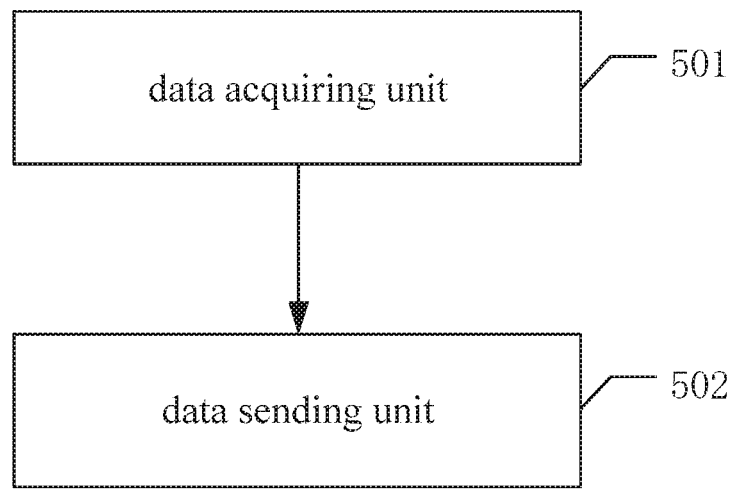
FIG. 5 is a block diagram of a road operation device according to an embodiment of the present disclosure.

FIG. 5 is a block diagram of a road operation device according to an embodiment of the present disclosure. As illustrated in FIG. 5, the road operation device includes a data acquiring unit 501 and a data sending unit 502.

The data acquiring unit 501 is configured to acquire dynamic map data of a road work site where the road operation device is located.

The data sending unit 502 is configured to provide the dynamic map data to a map service system through a dynamic map data acquisition system, such that the map service system reflects content of the dynamic map data in a predetermined product form.

After the road operation device is started, the data acquiring unit 501 can acquire the dynamic map data of the road work site where the road operation device is located periodically.

Generally, the dynamic map data at least includes location information of the road operation device, such as latitude and longitude information of the location. Furthermore, the dynamic map data may also include other information, such as acquisition time (the current time), identification of road operation device, the type of the road work site, and the like.

The data acquiring unit 501 can acquire the location information through the positioning function of the road operation device, and acquire the time information through the built-in clock of the road operation device. The interval duration between acquisitions of data by the road operation device may be determined according to actual needs.

The data sending unit 502 can report the dynamic map data acquired to the dynamic map data acquisition system, the dynamic map data acquisition system can provide the dynamic map data to the map service system, such that the map service system can reflect the content of the dynamic map data in the predetermined product form.

Furthermore, the road operation device shown in FIG. 5 may further include a managing unit 503. The managing unit 503 is configured to connect to a device management system, such that a manager manages the road operation device through the equipment management system.

For example, the manager of the road operation device can check the operation state, the operation location and the operation duration of the road operation device in real time through the device management system. For example, the manager of the road operation device may store the operation information (such as the operation location, the operation duration, etc.) of the road operation device, such that the operation information can be viewed later when needed. For example, when there is a need to use the road operation device, the road operation device may be determined based on, such as historical operation duration stored.

Figure 6:
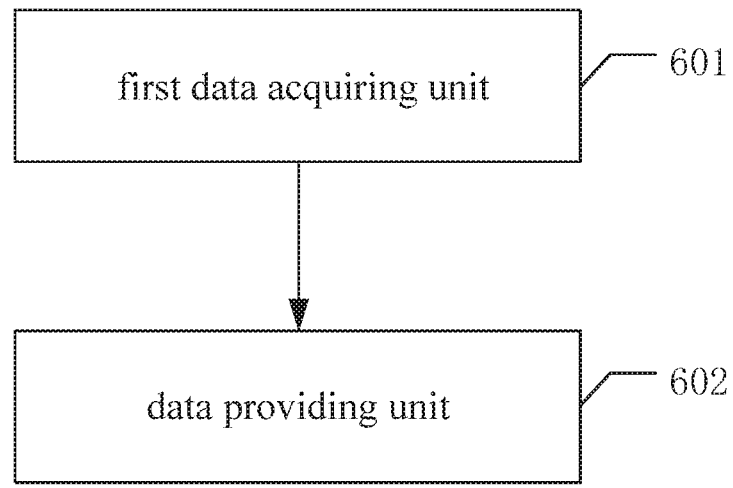
FIG. 6 is a block diagram of a device for acquiring dynamic map data according to an embodiment of the present disclosure.

FIG. 6 is a block diagram of a device for acquiring dynamic map data according to an embodiment of the present disclosure. As illustrated in FIG. 6, the device includes a first data acquiring unit 601 and a data providing unit 602.

The first data acquiring unit 601 is configured to acquire dynamic map data reported by a road operation device having a network access capability. The dynamic map data is acquired by the road operation device in a road work site where the road operation device is located.

The data providing unit 602 is configured to provide the dynamic map data to a map service system, such that the map service system reflects content of the dynamic map data in a predetermined product form.

The data providing unit 602 may process the dynamic map data in a predetermined manner, and provide processed dynamic map data to the map service system.

The processing may include eliminating abnormal data, normalizing the data format, and the like. The data may be classified according to different data types, for subscription of the map service system.

The data providing unit 602 can provide the processed dynamic map data to the map service system, such that the map service system can reflect the content of the dynamic map data in the predetermined product form.

For the processed dynamic map data, the data providing unit 602 may support subscription of the map service system, and may also support active push of the data to the map service system.

Figure 7:
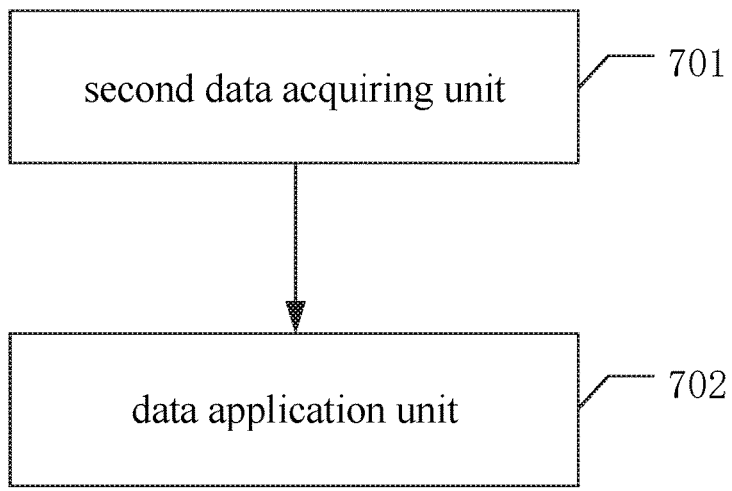
FIG. 7 is a block diagram of a map service device according to an embodiment of the present disclosure.

FIG. 7 is a block diagram of a map service device according to an embodiment of the present disclosure. As illustrated in FIG. 7, the map service device includes a second data acquiring unit 701 and a data application unit 702.

The second data acquiring unit 701 is configured to acquire dynamic map data from a dynamic map data acquisition system. The dynamic map data is acquired by a road operation device having a network access capacity in a road work site where the road operation device is located and sent to the dynamic map data acquisition system by the road operation device.

The data application unit 702 is configured to reflect content of the dynamic map data in a predetermined product form.

The second data acquiring unit 702 can acquire the dynamic map data pushed by the dynamic map data acquisition system actively, or subscribe the dynamic map data from the dynamic map data acquisition system.

Based on the dynamic map data acquired, the data application unit 702 can reflect the content of the dynamic map data in the predetermined product form, such as map road conditions, navigation routes, and induced broadcast.

For operation process of the device embodiments shown in FIG. 5, FIG. 6 and FIG. 7, reference may be made to the foregoing method embodiments, and details are not described herein.

By applying the solutions described in the foregoing device embodiments, the dynamic map data can be accurately acquired by the Internet of Things device (such as the road operation device) set at the road work site, such that the accuracy of the dynamic map data acquired can be improved, and timeliness and stability of dynamic map data acquired can be guaranteed.

In addition, by applying the solutions described in the foregoing device embodiments, the road operation device can be better managed through the device management system, and management efficiency can be improved.

Further, by applying the solutions described in the foregoing device embodiments, the field of acquisition of dynamic map data can be developed, which has important operation values for accelerating uploading of road operation information, the map usage experience of the user can be greatly improved, the user can accurately avoid road construction areas based on the dynamic map data, and safety of field workers can be improved.

Figure 8:
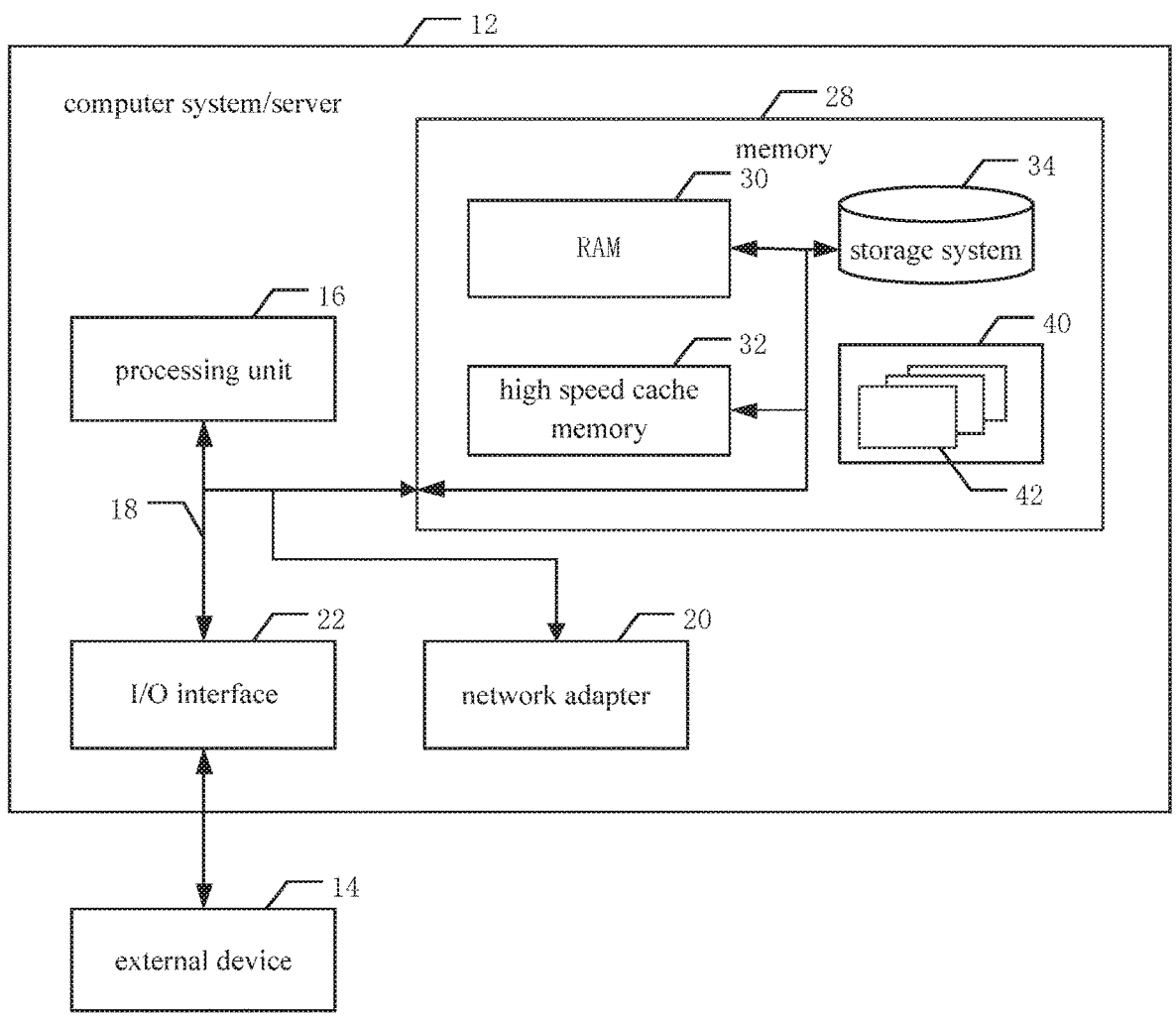
FIG. 8 is a schematic diagram of a computer system/server according to an embodiment of the present disclosure.

FIG. 8 illustrates a block diagram of an exemplary computer system/server 12 suitable for realizing implementations of the present disclosure. The computer system/server 12 illustrated in FIG. 8 is merely an example, which should be not understood to limit the functions and usage scope of embodiments of the present disclosure.

As illustrated in FIG. 8, the computer system/server 12 may be represented in the form of a general purpose computing device. Components of the computer system/server 12 may include, but is not limited to, one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer system/server 12 typically includes a variety of computer system readable media. These media may be any available media accessible by the computer system/server 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer system/server 12 may further include other removable or non-removable, volatile or non-volatile computer system storage media. By way of example only, the storage system 34 may be configured to read and write a non-removable and non-volatile magnetic media (not shown in FIG. 8, commonly referred to as a "hard drive"). Although not shown in FIG. 8, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer system/server 12 may also communicate with one or more external devices 14 (such as, a keyboard, a pointing device, a display 24, etc.). Furthermore, the computer system/server 12 may also communicate with one or more communication devices enabling a user to interact with the computer system/server 12 and/or other devices (such as a network card, modem, etc.) enabling the computer system/server 12 to communicate with one or more computer system/servers. This communication can be performed via the input/output (I/O) interface 22. Also, the computer system/server 12 may communicate with one or more networks (such as a local area network (hereafter referred to as LAN), a wide area network (hereafter referred to as WAN) and/or a public network such as an Internet) through a network adapter 20. As shown in FIG. 8, the network adapter 20 communicates with other modules of the computer system/server 12 over the bus 18. It should be understood that, although not shown in FIG. 8, other hardware and/or software modules may be used in connection with the computer system/server 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method in the embodiments illustrated in FIG. 1, FIG. 2 or FIG. 3.

Embodiments of the present disclosure further provide a storage medium including computer programs that, when executed by a processor, the method in the embodiments illustrated in FIG. 1, FIG. 2 or FIG. 3 is implemented.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In several embodiments provided by the present disclosure, it should be understood that, the system, devices and method disclosed can be realized in any other manner. For example, the device embodiments described above can be merely exemplary, for example, the units are just divided according to logic functions. In practical implementation, the units can be divided in other manners.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

The above-described integrated unit implemented in the form of a software functional unit can be stored in a computer readable storage medium. The software functional unit described above is stored in a storage medium, and includes several instructions for causing a computer device (for example, a personal computer, a server, or a network device, etc.) or a processor to perform all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The above is only the alternative embodiments of the present disclosure, and is not intended to limit the present disclosure. Any modifications, equivalent substitutions, improvements, etc., made within the spirit and scope of the present disclosure should be intended to be included within the scope of the present disclosure.

What is claimed is:

1. A method for acquiring dynamic map data, applicable to a road operation device having a network access capacity, comprising: acquiring dynamic map data of a road work site where the road operation device is located; wherein the road operation device is provided with buttons, each button corresponds to a current type of the road work site including road construction, accident and temporary traffic control; and providing the dynamic map data and the current type of the road work site to a map service system through a dynamic map data acquisition system, such that the map service system reflects content of the dynamic map data in a predetermined product form.

2. The method according to claim 1, wherein acquiring the dynamic map data of the road work site where the road operation device is located comprises:
acquiring the dynamic map data of the road work site where the road operation device is located periodically.

3. The method according to claim 1, wherein the dynamic map data at least comprises location information of the road operation device.

4. The method according to claim 1, further comprising:
connecting the road operation device to a device management system, such that a manager manages the road operation device through the device management system.

5. The method according to claim 1, wherein the dynamic map data is processed by the dynamic map data acquisition system in a predetermined manner, and processed dynamic map data is provided to the map service system by the dynamic map data acquisition system,
wherein processing the dynamic map data comprises:
eliminating abnormal dynamic map data;
normalizing a data format.

6. The method according to claim 1, wherein the dynamic map data is actively pushed by the dynamic map data acquisition system to the map service system, or the dynamic map data is subscribed by the map service system from the dynamic map data acquisition system.

7. The method according to claim 1, wherein the predetermined product form comprises a road condition, a navigation route, and induced broadcast.

8. A road operation device, comprising: a memory; a processor; and a computer program stored in the memory and executable by the processor, wherein when the processor executes the program, the processor is configured to: acquire dynamic map data of a road work site where the road operation device is located; wherein the road operation device is provided with buttons, each button corresponds to a current type of the road work site including road construction, accident and temporary traffic control; and provide the dynamic map data and the current type of the road work site to a map service system through a dynamic map data acquisition system, such that the map service system reflects content of the dynamic map data in a predetermined product form.

9. The road operation device according to claim 8, wherein the processor is configured to:
acquire the dynamic map data of the road work site where the road operation device is located periodically.

10. The road operation device according to claim 8, wherein the dynamic map data at least comprises location information of the road operation device.

11. The road operation device according to claim 8, wherein the processor is further configured to:
connect to a device management system, such that a manager manages the road operation device through the device management system.

12. The road operation device according to claim 8, wherein the dynamic map data is processed by the dynamic map data acquisition system in a predetermined manner, and processed dynamic map data is provided to the map service system by the dynamic map data acquisition system,
wherein processing the dynamic map data comprises:
eliminating abnormal dynamic map data;
normalizing a data format.

13. The road operation device according to claim 8, wherein the dynamic map data is actively pushed by the dynamic map data acquisition system to the map service system, or
the dynamic map data is subscribed by the map service system from the dynamic map data acquisition system.

14. The road operation device according to claim 8, wherein the predetermined product form comprises a road condition, a navigation route, and induced broadcast.

15. A non-transitory computer readable storage medium, configured to store a computer program that, when executed by a processor, causes a method for acquiring dynamic map data to be implemented, wherein the method comprises:
acquiring dynamic map data of a road work site where the road operation device is located; wherein the road operation device is provided with buttons, each button corresponds to a current type of the road work site including road construction, accident and temporary traffic control, and providing the dynamic map data and the current type of the road work site to a map service system through a dynamic map data acquisition system, such that the map service system reflects content of the dynamic map data in a predetermined product form.

16. The computer readable storage medium according to claim 15, acquiring the dynamic map data of the road work site where the road operation device is located comprises:
acquiring the dynamic map data of the road work site where the road operation device is located periodically.

17. The computer readable storage medium according to claim 15, wherein the dynamic map data at least comprises location information of the road operation device.

18. The computer readable storage medium according to claim 15, wherein the method further comprises:
connecting the road operation device to a device management system, such that a manager manages the road operation device through the device management system.

19. The computer readable storage medium according to claim 15, wherein the dynamic map data is processed by the dynamic map data acquisition system in a predetermined manner, and processed dynamic map data is provided to the map service system by the dynamic map data acquisition system,
wherein processing the dynamic map data comprises:
eliminating abnormal dynamic map data;
normalizing a data format.

20. The computer readable storage medium according to claim 15, wherein the dynamic map data is actively pushed by the dynamic map data acquisition system to the map service system, or
the dynamic map data is subscribed by the map service system from the dynamic map data acquisition system,
wherein the predetermined product form comprises a road condition, a navigation route, and induced broadcast.

* * * * *